United States Patent
Parivash

(10) Patent No.: US 7,706,850 B2
(45) Date of Patent: Apr. 27, 2010

(54) INTEGRATED DETACHABLE PDA AND CELLULAR PHONE

(76) Inventor: Jamshid Parivash, 253 Fremont Ave., Los Altos, CA (US) 94022

(*) Notice: Subject to any disclaimer, the term of this patent is extended or adjusted under 35 U.S.C. 154(b) by 723 days.

(21) Appl. No.: 10/804,857

(22) Filed: Mar. 19, 2004

(65) Prior Publication Data
US 2006/0160567 A1   Jul. 20, 2006

(51) Int. Cl.
*H04M 1/00*   (2006.01)
(52) U.S. Cl. .............. 455/575.4; 455/556.1; 455/556.2; 455/90.3; 455/41.2; 379/433.02
(58) Field of Classification Search ...... 455/556.1–557, 455/575.1, 90.3, 572–574, 569.1, 575.9, 455/41.2; 379/428.01
See application file for complete search history.

(56) References Cited

U.S. PATENT DOCUMENTS

| | | | | |
|---|---|---|---|---|
| 5,020,090 A | * | 5/1991 | Morris | 455/556.1 |
| 5,533,097 A | * | 7/1996 | Crane et al. | 455/552.1 |
| 5,566,226 A | * | 10/1996 | Mizoguchi et al. | 455/558 |
| 5,678,229 A | * | 10/1997 | Seki et al. | 455/572 |
| 5,797,088 A | * | 8/1998 | Stamegna | 455/345 |
| 5,797,089 A | * | 8/1998 | Nguyen | 455/403 |
| 5,898,758 A | * | 4/1999 | Rosenberg | 455/426.1 |
| 5,907,815 A | * | 5/1999 | Grimm et al. | 455/557 |
| 5,924,044 A | * | 7/1999 | Vannatta et al. | 455/556.1 |
| 5,974,334 A | * | 10/1999 | Jones, Jr. | 455/556.2 |
| 5,983,073 A | | 11/1999 | Ditzik | |
| 6,188,917 B1 | * | 2/2001 | Laureanti | 455/573 |
| 6,233,464 B1 | * | 5/2001 | Chmaytelli | 455/556.2 |
| 6,292,148 B1 | * | 9/2001 | Matsuura et al. | 343/702 |
| 6,633,759 B1 | * | 10/2003 | Kobayashi | 455/419 |
| 6,701,161 B1 | * | 3/2004 | Wendling | 455/556.1 |
| 6,725,060 B1 | * | 4/2004 | Chhatriwala et al. | 455/556.2 |
| 6,865,401 B2 | * | 3/2005 | Kotzin | 455/557 |
| 6,950,652 B2 | * | 9/2005 | Janssen et al. | 455/419 |
| 6,954,355 B2 | * | 10/2005 | Gerstner et al. | 361/679.09 |
| 6,999,800 B2 | * | 2/2006 | Peng et al. | 455/574 |
| 7,103,380 B1 | * | 9/2006 | Ditzik | 455/556.2 |
| 7,107,072 B1 | * | 9/2006 | Smith | 455/556.2 |
| 7,383,061 B1 | * | 6/2008 | Hawkins | 455/556.2 |
| 2001/0027121 A1 | * | 10/2001 | Boesen | 455/556 |
| 2001/0039195 A1 | * | 11/2001 | Nickum | 455/557 |
| 2002/0140542 A1 | | 10/2002 | Prokoski et al. | |
| 2002/0198021 A1 | * | 12/2002 | Boesen | 455/556 |
| 2003/0050019 A1 | * | 3/2003 | Dowling et al. | 455/90 |
| 2003/0092468 A1 | * | 5/2003 | North | 455/556 |
| 2003/0153355 A1 | * | 8/2003 | Warren | 455/557 |
| 2004/0023700 A1 | | 2/2004 | Gupte | |
| 2004/0142725 A1 | * | 7/2004 | Kim | 455/556.1 |
| 2004/0185901 A1 | * | 9/2004 | Kachi et al. | 455/556.1 |
| 2007/0004450 A1 | * | 1/2007 | Parikh | 455/556.1 |

* cited by examiner

*Primary Examiner*—Sharad Rampuria
(74) *Attorney, Agent, or Firm*—Squire, Sanders & Dempsey, L.L.P.

(57) ABSTRACT

In accordance with the present invention, a system includes a personal digital assistant (PDA) and a cellular phone adapted to be coupled to the PDA so that upon coupling the cellular phone to the PDA the combined cellular phone and PDA forms a single body.

16 Claims, 4 Drawing Sheets

PDA BACK SIDE WITH CELL PHONE REMOVED

PDA BACK SIDE WITH CELL PHONE INSERTED

INTEGRATED DETACHABLE PDA AND CELLULAR PHONE

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates in general to wireless communication, and in particular to an integrated detachable personal digital assistant (PDA) and cellular phone system.

Portable devices such as cellular phones, laptop computers, and PDAs (e.g., Palm devices and pocket PCs) are being widely used. At the same time, the recent advancements in the wireless communication technology have enabled wireless communication among these portable and other types of devices. Internet access via PDAs and cell phones are becoming more readily available. It is not uncommon for individuals such as business people or students to carry a cell phone and a PDA on their belt and a laptop computer in their brief case or backpack. Each of these devices serves a different purpose and needs to be readily available for use. However, carrying both a cell phone and a PDA on one's belt at all times can be cumbersome. One approach in addressing this problem has been to combine the functionality of the cell phone and PDA into a single device such as the commercially available Blackberry devices. However, the size of these devices, from a practical stand point, is still too large for comfortable daily usage. In certain circumstance, e.g., while on vacation or in a social setting, one may not need the processing power of the Blackberry type of devices but may need the cell phone capability. Alternatively, while at work or in meetings, one may need the processing power as well as the wireless capability of the cell phone to enable, for example, internet connection.

The Blackberry type of device has another limitation. Simultaneous use of the device as a cell phone and its other functionalities is not possible. For example, while the device is being used for word processing purposes, upon receiving a telephone call, the word processing is automatically stopped so that the telephone function can be used. As another example, when a telephone call is in progress it is not possible to access the device to view the calendar for scheduling purposes or obtain other information stored in the device.

Thus, there is a need for an integrated PDA, cell phone system which overcomes the above-mentioned limitations.

BRIEF SUMMARY OF THE INVENTION

In accordance with the present invention, A system includes a personal digital assistant (PDA) and a cellular phone adapted to be coupled to the PDA so that upon coupling the cellular phone to the PDA the combined cellular phone and PDA forms a single body.

In one embodiment, the size of the single body is substantially the same as the size of the PDA.

In another embodiment, each of the PDA and the cellular phone has a latching mechanism for latching the cellular phone to the PDA when the cellular phone is coupled to the PDA.

In another embodiment, the PDA has a cavity configured such that the cellular phone can be inserted therein.

In another embodiment, the PDA has a cut-out portion configured so that when the cellular phone is coupled to the PDA, the cellular phone substantially fills the cut-out portion of the PDA.

In another embodiment, the PDA has a keyboard and a display, and the cellular phone and the PDA are adapted so that when the cellular phone is coupled to the PDA, the PDA keyboard and display can be used in placing or receiving telephone calls.

In another embodiment, the cellular phone and the PDA are adapted so that when the cellular phone is coupled to the PDA, the keyboard and the display of the PDA is used along with the wireless communication resources of the cellular phone to connect to and communicate with the internet.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

In accordance with the present invention, a processing device (such as a PDA or a laptop) and a wireless communication device (such as a cell phone) are adapted to be coupled together in a detachable manner. When coupled together, the two units form a single (unitary) body.

Figure 1:
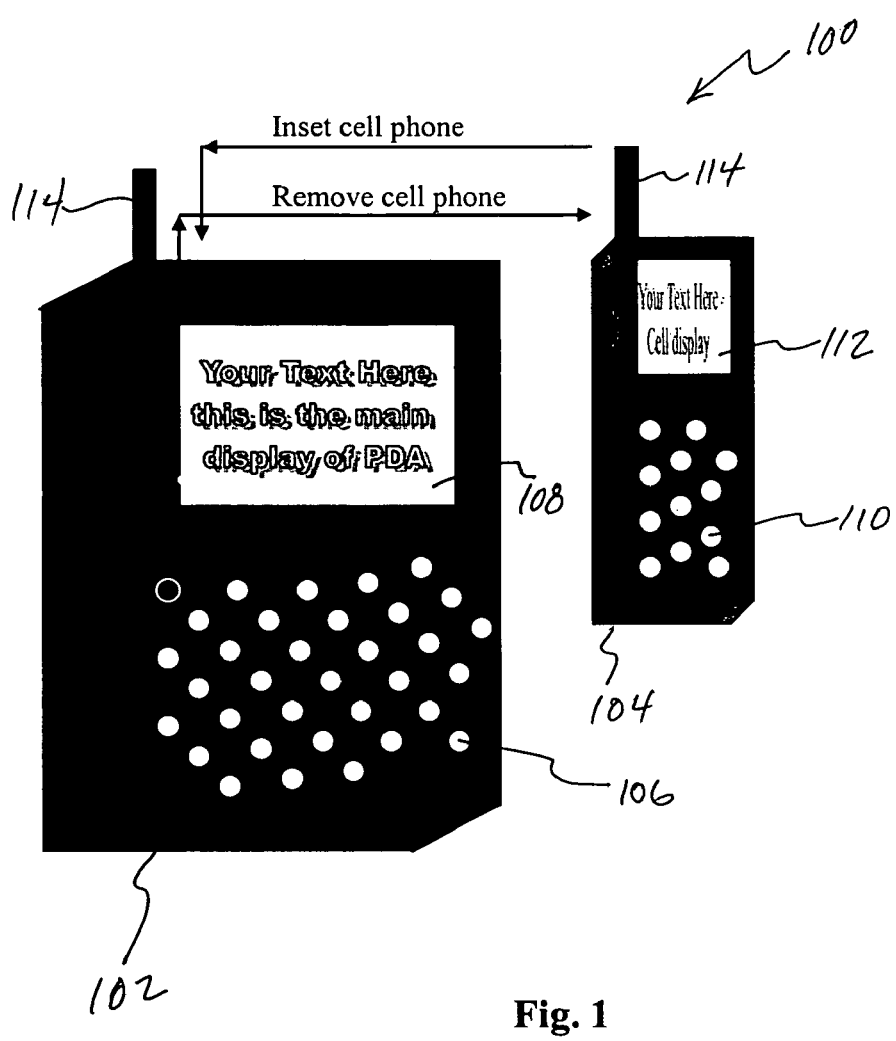
FIG. 1 shows a system which includes an integrated detachable PDA and cell phone in accordance with an exemplary embodiment of the present invention.

FIG. 1 shows a system 100 which includes an integrated detachable PDA 102 and a cell phone 104 in accordance with an exemplary embodiment of the present invention. PDA 102 is a processing device having a conventional keyboard 106 and a conventional display 108. Alternatively, PDA 102 may have a touch screen keyboard rather than a conventional keyboard. PDA 102 may have simple functionality such as those of conventional electronic organizers, or may alternatively have more complex functionality as in commercially available Pocket PCs.

Cellular phone 104 includes a conventional alphanumeric key board 110 and a conventional display 112. Each of PDA 102 and cell phone 104 has battery operation capability. In one embodiment, while cell phone 104 has a conventional antenna 114, PDA 102 does not have an antenna of its own. The antenna shown at the top of PDA 102 is that of cell phone 104 when coupled to PDA 102.

Figure 2A:
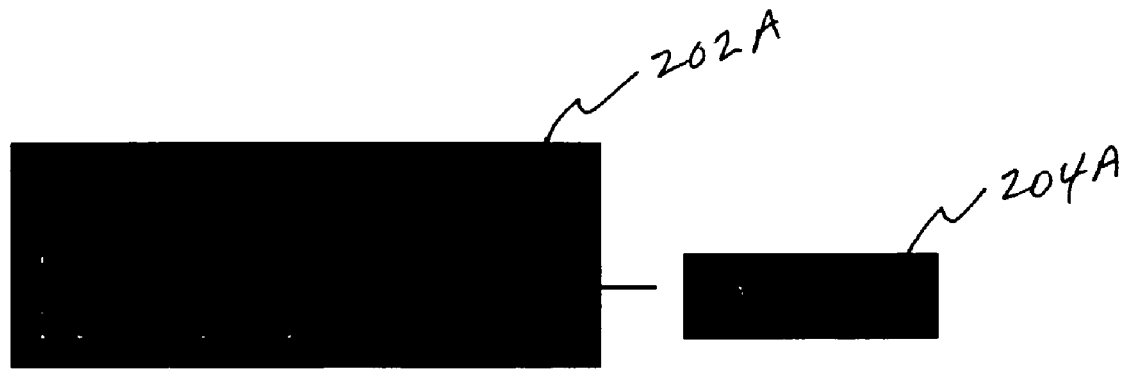
FIGS. 2A and 2B respectively show top and side views of two examples of how the cell phone and the PDA shown in FIG. 1 can be coupled together.
Figure 2B:
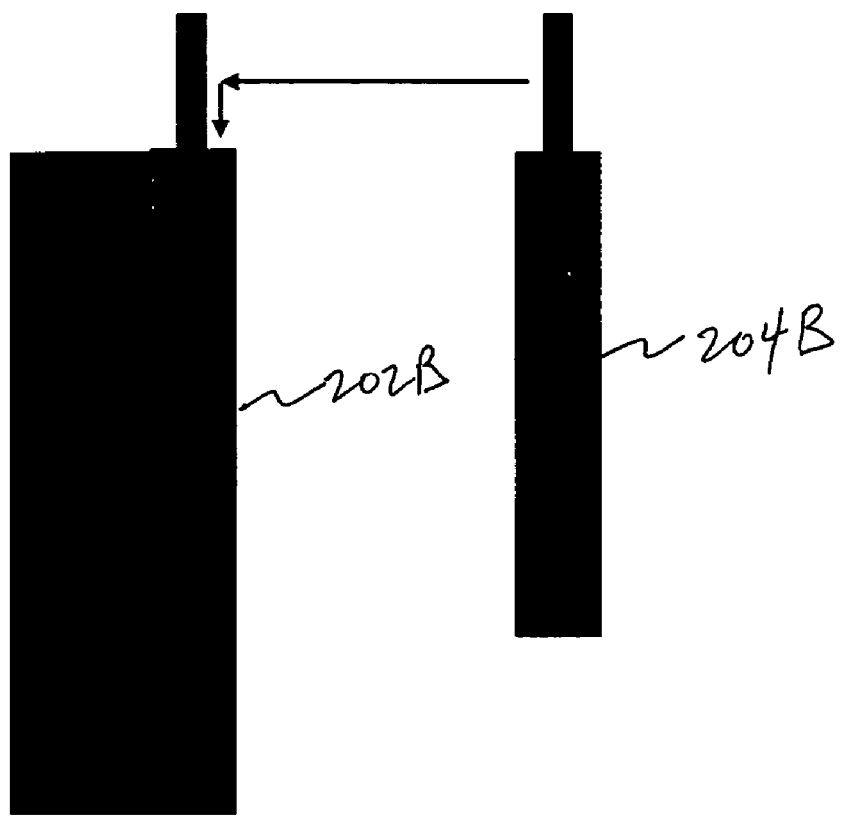

The housing of PDA 102 may be designed so that cell phone 104 can be coupled to PDA 102 by any one of a number of commonly known latching mechanisms such as slide-in, snap-on, or push-pull. FIGS. 2A and 2B show two examples of how PDA 102 and cell phone 104 can be coupled together. Many other possible designs and ways for coupling these two devices together can be envisioned by one skilled in this art in view of this disclosure.

In FIG. 2A, PDA 202A has a cavity wherein cell phone 204A can be inserted much like batteries are inserted in battery operated devices. When the cell phone is removed from the cavity, a flap or cover (not shown) can be used to cover the cavity opening to protect the interior of the cavity. In the FIG. 2A example, the location of the cavity is shown at a particular corner along the top of PDA 202A. However, the cavity may be located at any location along the top, bottom, or sides of the PDA as dictated by the particular design and functionality desired.

In FIG. 2B, PDA 202B has a cut-out section where the cell phone can be attached to or removed from the PDA. Once again, the cut-out section may be anywhere along the top, bottom, or sides depending on the design goals and the desired functionality. The exemplary embodiment in FIG. 2B advantageously makes any buttons or keys along one or more sides of the cell phone accessible for possible use while the cell phone is coupled to the PDA.

Figure 3:
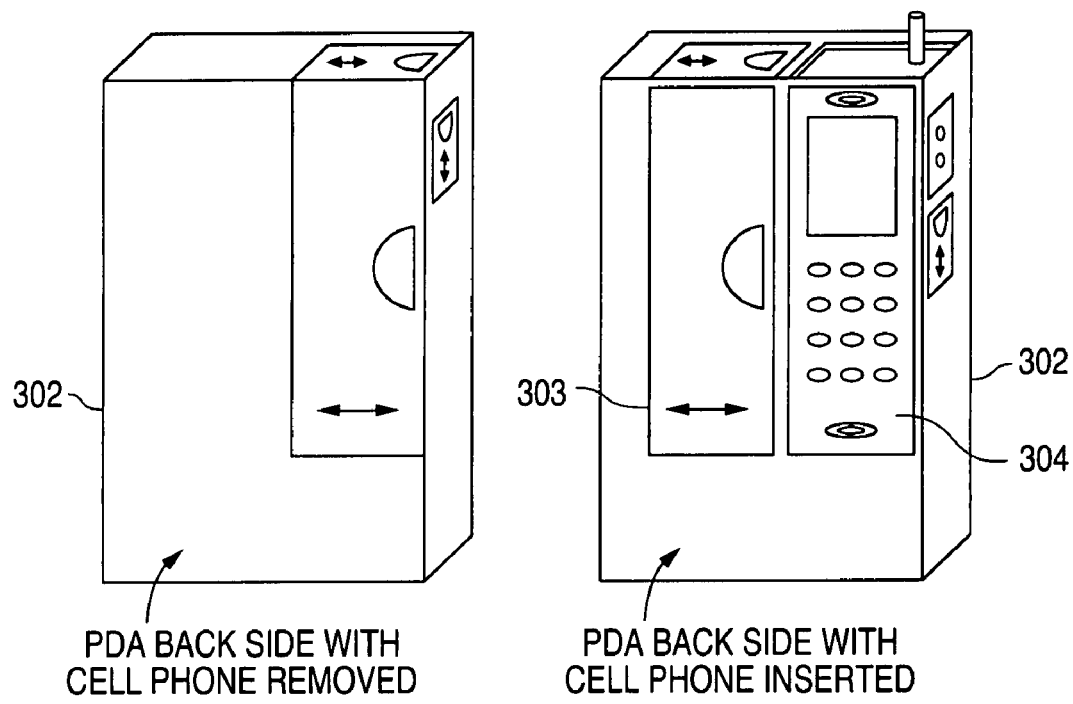
FIG. 3 shows backside views of the PDA with the cell phone coupled to the PDA (right figure) and with the cell phone removed from the PDA (left figure), in accordance with an exemplary embodiment of the present invention.

FIG. 3 shows backside views of a PDA 302 with a cell phone 304 coupled to the PDA (right figure) and with the cell phone removed from the PDA (left figure). FIG. 3 is intended to illustrate two possible ways that the cell phone can be integrated with the PDA. In the first approach, the PDA merely functions as a housing for the cell phone (i.e., when coupled together, there is no communication between the two devices), and in the second approach the two devices share resources when coupled together (i.e., when coupled together, the two devices communicate with one another).

In the first approach, when the two devices are coupled together, upon receiving a call, the sliding door 303 on the back of the PDA can be moved to the left to expose the cell phone so that it can be used without removing it from the PDA. In one variation of this approach, the cell phone and the PDA are adapted, using conventional techniques, to allow communication between them via an infrared interface, or frequency signals (e.g., Bluetooth enabled), or any other known methods of wireless communication. In yet another variation, the cell phone and PDA can be adapted to allow the cell phone battery to be charged by the PDA battery during the time the cell phone is coupled to the PDA.

An advantage of the first approach over the second approach is that the first approach does not require duplication of some of the cell phone resources (such as the earphone or speaker) on the PDA, and in general results in a less complex and more compact PDA. Also, no hardware provisions need to be made to allow simultaneous use of the PDA and the cell phone. That is, since the two devices operate independent of one another even when they are coupled together, and by using a wireless or wired headset, the user can simultaneously use the cell phone and access the PDA without the need to decouple them. The first approach however, does not offer many of the functions and conveniences that are available in the second approach as described further below.

The operation of system 100 (FIG. 1) is as follows. Each of PDA 102 and cell phone 104 has its own processing unit(s) such as one or more central processing units (CPUs) and/or one or more digital signal processors (DSPs). When cell phone 104 is detached from PDA 102, the cell phone and PDA each operates as do conventional counterpart devices. That is, once detached from one another, PDA 102 will not have wireless communication capabilities but can be used to perform functions commonly available on PDAs. Similarly, once the cell phone is removed from the PDA, the cell phone is used similar to conventional cell phones.

Figure 4:
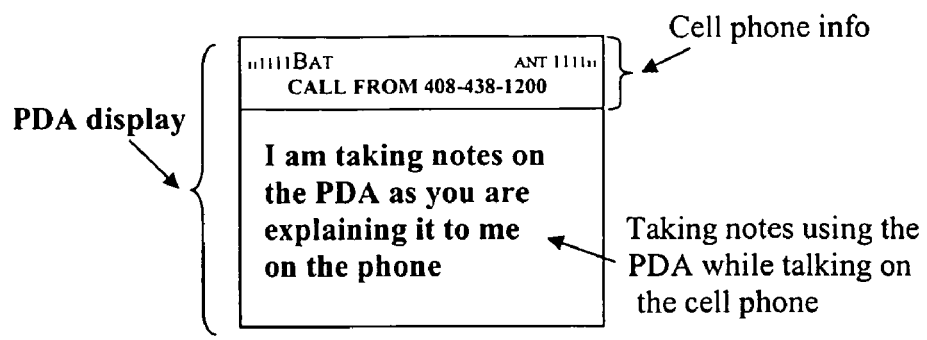
FIG. 4 shows an exemplary embodiment of a PDA display having a predesignated area for displaying the cell phone information while the remainder of the PDA display is used for other purposes.

In one embodiment, when cell phone 104 is coupled to PDA 102, the resources in the PDA and the cell phone are shared such that the processor unit(s) in the PDA functions as the host processor(s), while the processor unit(s) in the cell phone functions as the peripheral. For example, the cell phone resources for transmitting and receiving of the digital and/or analog signals may be used by the PDA to place or receive telephone calls via the PDA. In this embodiment, the PDA display may be modified from conventional displays so that a strip of information relating to the cell phone may be displayed within the PDA display. An example of such a display is shown in FIG. 4. In FIG. 4, the strip along the top of the display provides the same information (such as the remaining battery charge and reception strength) normally provided on the cell phone display. This enables the simultaneous use of the cell phone and such PDA functionalities as the calendar function or word processing function.

The USB On The Go (OTG) standard is a means of allowing a device to be configured both as a host and as a peripheral. A device that is equipped with USB OTG will negotiate with another USB enabled device to determine which device will act as the host and which will act as the peripheral. This is an established standard that is finding commercial applications. The OTG Supplement to the USB 2.0 Specification Rev 1.0 was formally released on Dec. 18, 2001 by the USB Implementers Forum (USB-IF), a non-profit corporation founded by the group of companies that developed the USB Specification. Developed by the USB On-The-Go Committee working under the auspices of the USB 2.0 Promoter Group, the OTG Supplement details the functional, mechanical, electrical, software specifications, and goals for OTG devices. The complete USB OTG Supplement, incorporated herein by reference, is publicly available on the internet at http://www.usb.org/developers/onthego/.

Figure 5:
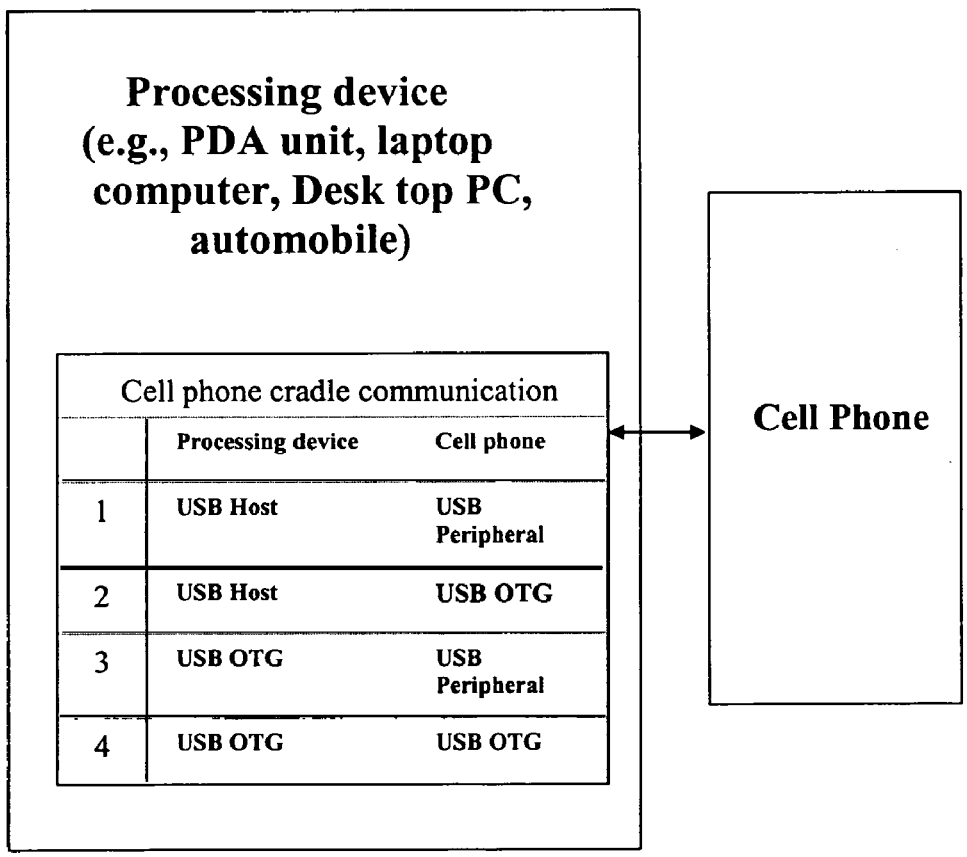
FIG. 5 schematically depicts communication between a cell phone and a processing device via one of four possible communication protocols.

The USB OTG standard or other similar communication protocols commercially available can be used to establish and enable communication between the cell phone and the PDA. Any of the arrangements in the table below could be used to establish communication between the two devices. Selection of one of these arrangements depends on the commercial applications of the integrated cell phone and PDA system. FIG. 5 shows, schematically, communication between the cell phone and the processing device (e.g., PDA) via one of the four possible communication protocols shown in the table below.

|   | Processing Device | Cell Phone |
|---|---|---|
| 1 | USB Host | USB Peripheral |
| 2 | USB Host | USB OTG |
| 3 | USB OTG | USB Peripheral |
| 4 | USB OTG | USB OTG |

Many other communication protocols can be defined that are proprietary in nature. The advantage of using a standard communications protocol is that the USB port can be used to connect to other peripherals without the need for extra connectors. Other standard bus architectures such as the I²C bus architecture could be used, but the I²C bus architecture has speed disadvantages and is usually not available externally. In such an arrangement the computing device would be an I²C master and the cell phone would have an I²C slave device on its connecting port.

The host (e.g., PDA) and the peripheral (e.g., cell phone) can be configured to have completely independent memories or alternatively their memories can be configured to synchronize to one another when the cell phone and PDA are coupled together. The synchronization process can utilize a standard protocol such as USB to establish communications.

In one embodiment, with each of the cell phone and the PDA having its own rechargeable battery, once coupled together, the PDA battery is used as the default power source for the integrated unit. However, the PDA can be designed to have a switching means for enabling the user to select the cell phone battery as the power source for the integrated unit in the event the PDA battery charge becomes low or runs out. Also, the system could be configured to allow the cell phone battery to be charged by the PDA battery during the time the cell phone remains coupled to the PDA.

In other embodiments, the cell phone may have digital camera and/or walky-talky capabilities, while the PDA may have video clips capabilities including recording of video clips on a removable storage media such as a memory card or a memory stick. Further, printing capability may be added to the PDA so that documents saved on the PDA may be printed via a wired or wireless connection to a printer. The PDA may also be adapted to enable transferring and sharing information between similar PDAs by such well known techniques as infrared or frequency signals. The cell phone may be adapted to communicate with a wireless headset. The wireless headset may have a rechargeable battery which can be charged by coupling it to the PDA or the cell phone. Of course, the wireless headset may alternatively be powered by the small (e.g., button size) batteries. In yet other embodiments, upon inserting the cell phone into the PDA, the stored information (e.g., contact and calendar information) in the two units may automatically be synchronized. The PDA may be designed to have a microphone and a speaker both coupled to the cell phone through the communication protocol. This enables use of the PDA as a cell phone, much like the Blackberry type of devices. Further, the PDA can be designed to have wireless internet access as well as wireless access to the corporate and/or home email via the cell phone resources.

The above functionalities and capabilities are commercially offered by various vendors, and as such implementation of these functionalities in the system of the present invention would be obvious to one skilled in this art in view of this disclosure. For example, ActiveSync which is a Microsoft product may be used to enable the synchronization capability between the PDA and the cell phone.

Another advantage of the system, in accordance with the present invention, over the commercially available Blackberry type of devices is that because the cell phone and the PDA are separate units, the user is no longer limited to the PDA product(s) offered by the cell phone carrier. This provides the user with a much wider selection of PDA's to choose from.

While the above is a complete description of specific embodiments of the present invention, it is possible to use various alternatives, modifications and equivalents. For example, although the above description has primarily been in the context of integration of a cell phone and a PDA, other similar systems wherein a cell phone is integrated with a system having a processing device, such as a laptop computer, desktop computer, or automobiles, can be implemented in a similar manner. Therefore, the scope of the present invention should be determined not with reference to the above description but should, instead, be determined with reference to the appended claims, along with their full scope of equivalents.

What is claimed is:

1. A system comprising:
    a processing device including a battery; and
    a wireless communication device including a battery and being adapted to be detachably coupled to the processing device,
    wherein when the processing device and the wireless communication device are coupled, the wireless communication device and the processing device are capable of being used independently and simultaneously to perform their respective functions,
    wherein when the wireless communication device and the processing device are decoupled, the processing device operates as a conventional processing device and the wireless communication device operates as a conventional wireless communication device,
    wherein the processing device is usable to place and receive a telephone call via the wireless communication device,
    wherein the processing device has a display that displays information related to the wireless communication device,
    wherein the information comprises information normally provided on a mobile phone display, and
    wherein the information comprises a remaining battery charge of the wireless communication device and a reception strength of the wireless communication device.

2. The system of claim 1, wherein when the processing device and the wireless communication device are coupled, the wireless communication device and the processing device share resources.

3. The system of claim 1,
    wherein the processing device includes a personal digital assistant that has a cavity and an opening,
    wherein the wireless communication device has a keyboard and is configured to be inserted into the cavity of the personal digital assistant, and
    wherein when the wireless communication device is inserted into the cavity of the personal digital assistant, a user can access the keyboard of the wireless communication device through the opening of the personal digital assistant.

4. The system of claim 3, wherein the personal digital assistant has a keyboard and a display.

5. The system of claim 3, wherein the personal digital assistant has a cover for the opening, and wherein the user can open the cover to access the keyboard of the wireless communication device through the opening of the personal digital assistant.

6. The system of claim 1,
    wherein the processing device has a battery,
    wherein the wireless communication device has a battery, and
    wherein when the processing device and the wireless communication device are coupled, both the wireless communication device and the processing device are powered by only one of the batteries of the processing device and the wireless communication device.

7. The system of claim 6, wherein the only one of the batteries is the battery of the processing device.

8. The system of claim 7, wherein the battery of the processing device is the default power source for the wireless communication device and the processing device.

9. The system of claim 7, further comprising a switch that allows for a user to set the default power source as either the battery of the processing device or the battery of the wireless communication device.

10. The system of claim 6, wherein the only one of the batteries is the battery of the wireless communication device.

11. The system of claim 1,
wherein when the processing device and the wireless communication device are coupled, the processing device functions as a host and the wireless communication device functions as a peripheral.

12. The system of claim 1,
wherein when the processing device and the wireless communication device are coupled, the wireless communication device functions as a host and the processing device functions as a peripheral.

13. The system of claim 1,
wherein the processing device includes a personal digital assistant that has a keyboard and a display, the personal digital assistant having a cuboid configuration and a cavity,
wherein the wireless communication device includes a cell phone that has a keyboard and a display and is configured such that the cell phone is insertable into the cavity of the personal digital assistant, and
wherein when the cell phone is inserted into the cavity of the personal digital assistant, the combination of the personal digital assistant and cell phone has the same cuboid configuration as the personal digital assistant does.

14. A system comprising:
a processing device; and
a wireless communication device adapted to be detachably coupled to the processing device,
wherein when the processing device and the wireless communication device are coupled, the wireless communication device and the processing device share resources,
wherein the processing device is usable to place and receive a telephone call via the wireless communication device, wherein the processing device has a display that displays information related to the wireless communication device, wherein the information comprises information normally provided on a mobile phone display, and wherein the information comprises a remaining battery charge of the wireless communication device and a reception strength of the wireless communication device.

15. The system of claim 14, wherein the information comprises a remaining battery charge of the wireless communication device and a reception strength of the wireless communication device.

16. A system comprising:
a processing device; and
a wireless communication device adapted to be detachably coupled to the processing device,
wherein when the processing device and the wireless communication device are coupled, the wireless communication device and the processing device share resources,
wherein the processing device includes a personal digital assistant that has a cavity and an opening,
wherein the wireless communication device has a keyboard and is configured to be inserted into the cavity of the personal digital assistant,
wherein when the wireless communication device is inserted into the cavity of the personal digital assistant, a user can access the keyboard of the wireless communication device through the opening of the personal digital assistant, and
wherein the personal digital assistant has a cover for the opening, and wherein the user can open the cover to access the keyboard of the wireless communication device through the opening of the personal digital assistant.

* * * * *